United States Patent
Garay et al.

(10) Patent No.: US 12,091,985 B2
(45) Date of Patent: Sep. 17, 2024

(54) ENGINE COMPONENT WITH STRUCTURAL SEGMENT

(71) Applicant: General Electric Company, Schenectady, NY (US)

(72) Inventors: Gregory Terrence Garay, West Chester, OH (US); Daniel Endecott Osgood, Loveland, OH (US); Douglas Gerard Konitzer, West Chester, OH (US)

(73) Assignee: General Electric Company, Evendale, OH (US)

(*) Notice: Subject to any disclaimer, the term of this patent is extended or adjusted under 35 U.S.C. 154(b) by 2 days.

(21) Appl. No.: 17/879,165

(22) Filed: Aug. 2, 2022

(65) Prior Publication Data

US 2022/0389821 A1 Dec. 8, 2022

Related U.S. Application Data

(63) Continuation of application No. 17/142,788, filed on Jan. 6, 2021, now Pat. No. 11,499,431.

(51) Int. Cl.
| | |
|---|---|
| *F01D 5/14* | (2006.01) |
| *F01D 5/16* | (2006.01) |
| *F01D 21/00* | (2006.01) |
| *G06F 30/17* | (2020.01) |
| *G06F 113/06* | (2020.01) |

(52) U.S. Cl.
CPC ............... *F01D 5/147* (2013.01); *F01D 5/16* (2013.01); *G06F 30/17* (2020.01);
(Continued)

(58) Field of Classification Search
CPC . F01D 5/147; F01D 5/187; F01D 5/16; F01D 5/18; F01D 5/186; F01D 21/003; F01D 25/12; F01D 5/28; F01D 5/26; F01D 9/02; F01D 5/183; F01D 5/184; F01D 9/041; F01D 25/04; F01D 25/06;
(Continued)

(56) References Cited

U.S. PATENT DOCUMENTS

| | | |
|---|---|---|
| 7,338,259 B2 | 3/2008 | Shah et al. |
| 7,871,247 B2 | 1/2011 | Shah et al. |

(Continued)

FOREIGN PATENT DOCUMENTS

| | | |
|---|---|---|
| EP | 0294176 A2 | 12/1988 |
| WO | 9933605 A2 | 7/1999 |

OTHER PUBLICATIONS

Maalawi, Karam Y. et al., "Optimal Frequency Design of Wind Turbine Blades", Apr. 9, 2002, Journal of Wind Engineering and Industrial Aerodynamics 90, Elsevier Science Ltd. (Year: 2002).

(Continued)

*Primary Examiner* — Eric J Zamora Alvarez
(74) *Attorney, Agent, or Firm* — McGarry Bair PC

(57) ABSTRACT

An engine component for a turbine engine, the engine component comprising a wall bounding an interior; a panel portion defining a portion of the wall, the panel portion comprising: an outer wall; an inner wall spaced from the outer wall to define a wall gap; and a structural segment formed within the wall gap comprising at least one structural element. The apparatus formed from a method including calculating a factor and adjusting a variable until the factor is between a given range.

20 Claims, 11 Drawing Sheets

(52) U.S. Cl.
CPC ...... *F05D 2220/32* (2013.01); *F05D 2240/30* (2013.01); *F05D 2250/21* (2013.01); *F05D 2260/96* (2013.01); *F05D 2300/605* (2013.01); *G06F 2113/06* (2020.01)

(58) Field of Classification Search
CPC .......... F01D 25/08; F01D 5/188; F01D 5/141; F01D 5/143; F05D 2220/32; F05D 2260/20; F05D 2260/204; F05D 2260/96; F05D 2300/606; F05D 2300/607; F05D 2230/31; F05D 2250/28; F05D 2250/283; F05D 2250/21; F05D 2260/22141; F05D 2300/514; F05D 2300/603; F05D 2300/605; F05D 2300/608; F05D 2240/30; F04D 29/388; F02C 3/08; F02C 7/00; G06F 30/17; G06F 2113/06
See application file for complete search history.

(56) References Cited

U.S. PATENT DOCUMENTS

| | | | |
|---|---|---|---|
| 8,079,821 B2* | 12/2011 | Campbell | F01D 5/18 |
| | | | 416/232 |
| 8,123,489 B2* | 2/2012 | Udall | F01D 5/147 |
| | | | 416/233 |
| 8,434,543 B2 | 5/2013 | Morris et al. | |
| 9,499,253 B1 | 11/2016 | White | |
| 9,533,485 B2* | 1/2017 | Marshall | F04D 29/023 |
| 9,557,479 B2 | 1/2017 | Suntsova et al. | |
| 9,845,600 B2 | 12/2017 | Sypeck | |
| 10,370,984 B2 | 8/2019 | Cernatescu et al. | |
| 10,697,304 B1 | 6/2020 | Li et al. | |
| 10,830,102 B2* | 11/2020 | Martin | B22F 5/009 |
| 2002/0074102 A1 | 6/2002 | Wang | |
| 2011/0241674 A1* | 10/2011 | Endo | G01R 33/307 |
| | | | 324/309 |
| 2015/0345298 A1* | 12/2015 | Mongillo | F01D 5/186 |
| | | | 415/173.1 |
| 2015/0354370 A1 | 12/2015 | Szijarto et al. | |

OTHER PUBLICATIONS

Cuadrado, David G. et al., "Engine-Scalable Rotor Casing Convective Heat Flux Evaluation Using Inverse Heat Transfer Methods", Jun. 11-15, 2018, Proceedings of ASME Turbo Expo 2018, ASME. (Year: 2018).

* cited by examiner

ENGINE COMPONENT WITH STRUCTURAL SEGMENT

CROSS REFERENCE TO RELATED APPLICATION(S)

This application is a continuation of U.S. patent application Ser. No. 17/142,788, filed Jan. 6, 2021, which is incorporated herein in its entirety.

TECHNICAL FIELD

This disclosure generally relates to a structural segment in an engine component.

BACKGROUND

Turbine engines, and particularly gas or combustion turbine engines, are rotary engines that extract energy from a flow of combusted gases passing through the engine onto a multitude of rotating turbine blades, which can be arranged in multiple turbine blade assemblies including disks, blades, and roots.

Turbine speeds are limited by the centrifugal stress that can be applied to the disks, blades, and roots. A high horsepower does not necessary equate to a high output speed. Higher horsepower and speeds can be obtained in special turbines and are frequently specified for large centrifugal compressors. These turbines need very careful checking for lateral critical speeds, torsional critical speeds, radial bearing stabilities, thrust bearings, balance, and permissible flange loadings.

A Campbell diagram is frequently used to determine the effect of multiple excitation frequencies in turbines. Excitation frequencies occur at various speeds which can equate to severe blade vibration.

DETAILED DESCRIPTION

Figure 1:
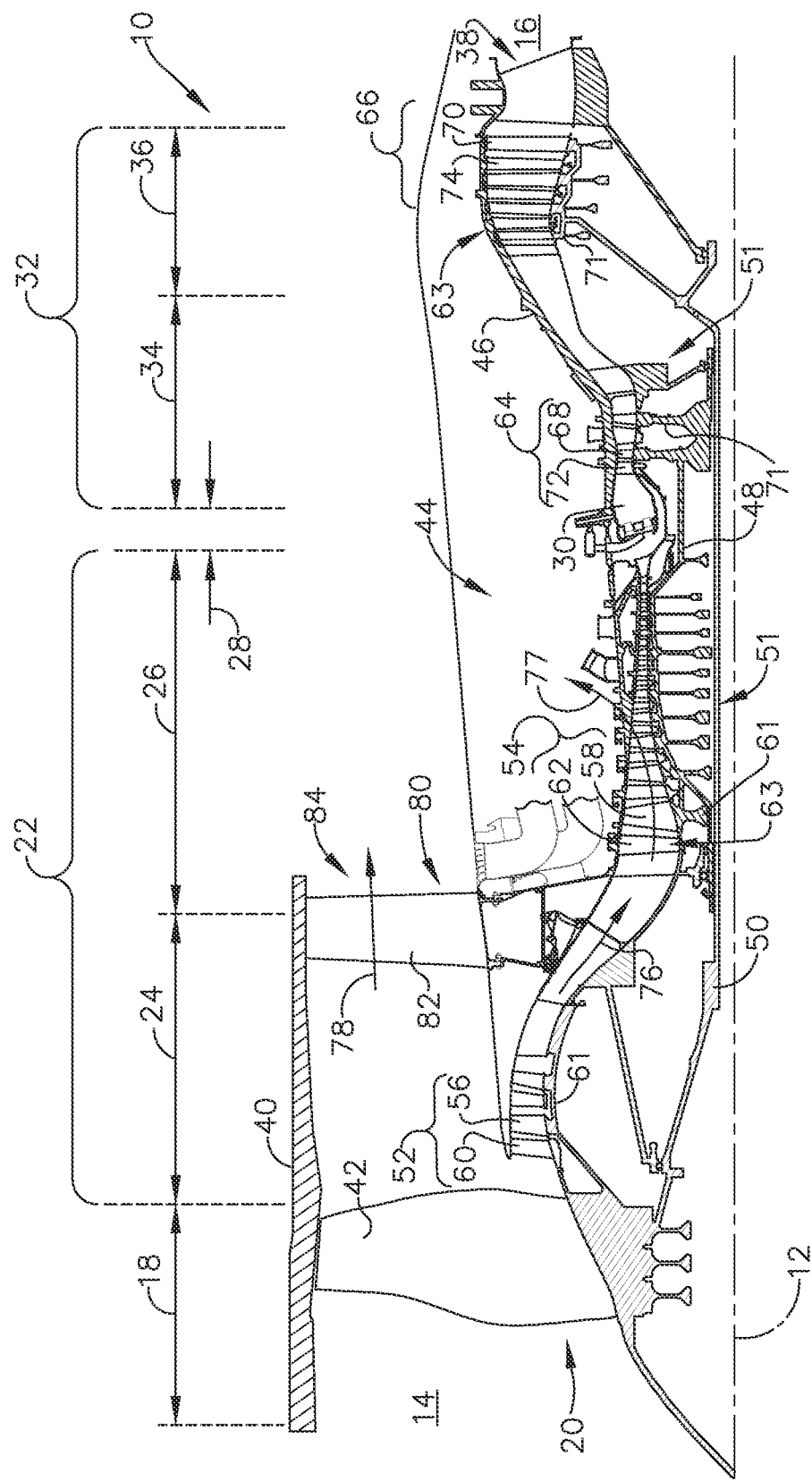
FIG. 1 is a schematic cross-sectional diagram of a turbine engine for an aircraft.

Aspects of the disclosure described herein are directed to a structural segment defining crystallographic and spatial directions selected to affect in a desired manner the mechanical dynamic responses of an engine component, and more specifically, defining a range of values for a frequency factor related to a modulus, a moment of inertia, and an area of a portion of the engine component. For purposes of illustration, the present disclosure will be described with respect to a turbine blade of a turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

Depending on the operating environment, desired durability, and/or operational lifecycle of the engine component, a process of manufacturing the engine component with the structural segment formed of any anisotropic material, by way of non-limiting example a single crystalline material or monocrystalline material (e.g., RENE N5 through known additive manufacturing techniques) needs to take into consideration the ability of the engine component to perform as intended when subjected to a variety of external effects. For example, in the case of a turbine blade used in a gas turbine engine, the blade needs to perform within a desired manner to provide desired thermal mass or heat transfer properties, internal cooling airflow properties, external aerodynamic properties, and structural-dynamic properties. Presently manufacturing a turbine blade capable of responding appropriately to the airflow, thermal, structural and aerodynamic performance requirements has been through the manufacture of test blades and performance of a variety of physical tests on each blade—thermal, structural and aerodynamic.

The manufacturing process in this example—a turbine blade for a gas turbine engine—therefore may proceed as follows. Start with an existing blade, make modifications to it to improve its internal airflow, thermal transfer and/or aerodynamic properties, and also assess the structural-dynamic response of the modified blade. If the structural dynamic response is unacceptable, given the modifications, then the structure (walls, fillets, thickness, ribs, material used) of the turbine blade needs modification. These modifications in turn can affect the heat transfer, airflow or aerodynamic properties of the blade. The process starts over again with additional physical tests. This process, testing, modifications, then re-testing can require several iterations of test blades, because the highly interdependent and non-linear variables influencing the blade's thermal and aerodynamic properties, internal & external cooling fluid flow behavior, external and inertial forces (both transient and steady state) requires manufacture of blades and testing of blades. While computer simulations can help and are used in the art to address engineering problems of this type, the present process still requires the manufacture and physical testing of a modified structural segment (e.g., a test turbine blade), typically several of such structural segments, before any meaningful insight is gained on the appropriate design needed. Defining a narrowed, or more limited class of structural segments that are worth testing, is therefore desired. Such a definition described herein takes into consideration the competing interests for optimal thermal, aerodynamic, internal airflow and structural dynamic response.

During the course of having routinely manufactured and tested several hundreds of turbine blades in the present process described, it was discovered, unexpectedly, that the design modifications responsive to structural dynamics could be taken into consideration in parallel to a re-design for accommodating thermal, aerodynamic and internal fluid flow requirements. More specifically, it was discovered that there is a value relating the structural dynamic properties of the blade to the range of modifications under consideration to address thermal and fluid dynamics of the blade, prior to the selection of a blade for manufacture and testing. Additionally, the inventors found this value is favorably range bound so as to limit the choices for acceptable blades, thereby significantly reducing time spent in redesigning and physically testing turbine blades. This value, called the Frequency Factor ("Ff"), developed from experiences designing turbine blades, can also be used in other structure that has thermal, fluid, and structural dynamic requirements.

As used herein "structural segment" is an engine component, for example a turbine blade or a portion thereof. A structural segment includes an anisotropic material such as a single crystalline material. A structural segment includes one or more pins, turbulators, matrices, and walls defining gaps where the pins, turbulators or matrices are disposed.

As used herein "structural element" is a portion of the structural segment, by way of non-limiting example pins, turbulators, matrices, and walls defining gaps where the pins, turbulators or matrices are disposed therein. The structural elements can be any shape and extend along a linear or curved direction.

As used herein a "panel portion" is a mathematical representation of the engine component, or a portion of the engine component.

As used herein "anisotropic material" is a material with properties that vary with crystallographic orientation. For purposes of determining a Frequency Factor ("Ff") for a particular blade, it was found sufficient that moduli for the anisotropic material could be represented using an effective isotropic modulus and maximum and minimal values, without any appreciable loss in accuracy. While the objective is to select an appropriate grain angle for the anisotropic material with respect to another angle defining structure extending within an interior passage (as explained in greater detail below), it was found sufficient to represent the anisotropic material modulus using an overall effective isotropic value, $E_o$, and values representing maximum and minimum values for the modulus: $E_{max}$, $E_{min}$ (see Equation (1)).

As used herein "baseline blade" is an example of a physical engine component such as an existing turbine blade where improvement or modifications are desired.

As used herein "modified blade" is an example of a physical engine component that is a modification of the baseline blade.

As used herein "tuned blade" is an example of a physical engine component that meets all desired requirements.

As used herein "test blade" is an example of a physical engine component that undergoes physical testing, the test blade, modified blade, and tuned blade can all be one in the same or separate physical engine components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
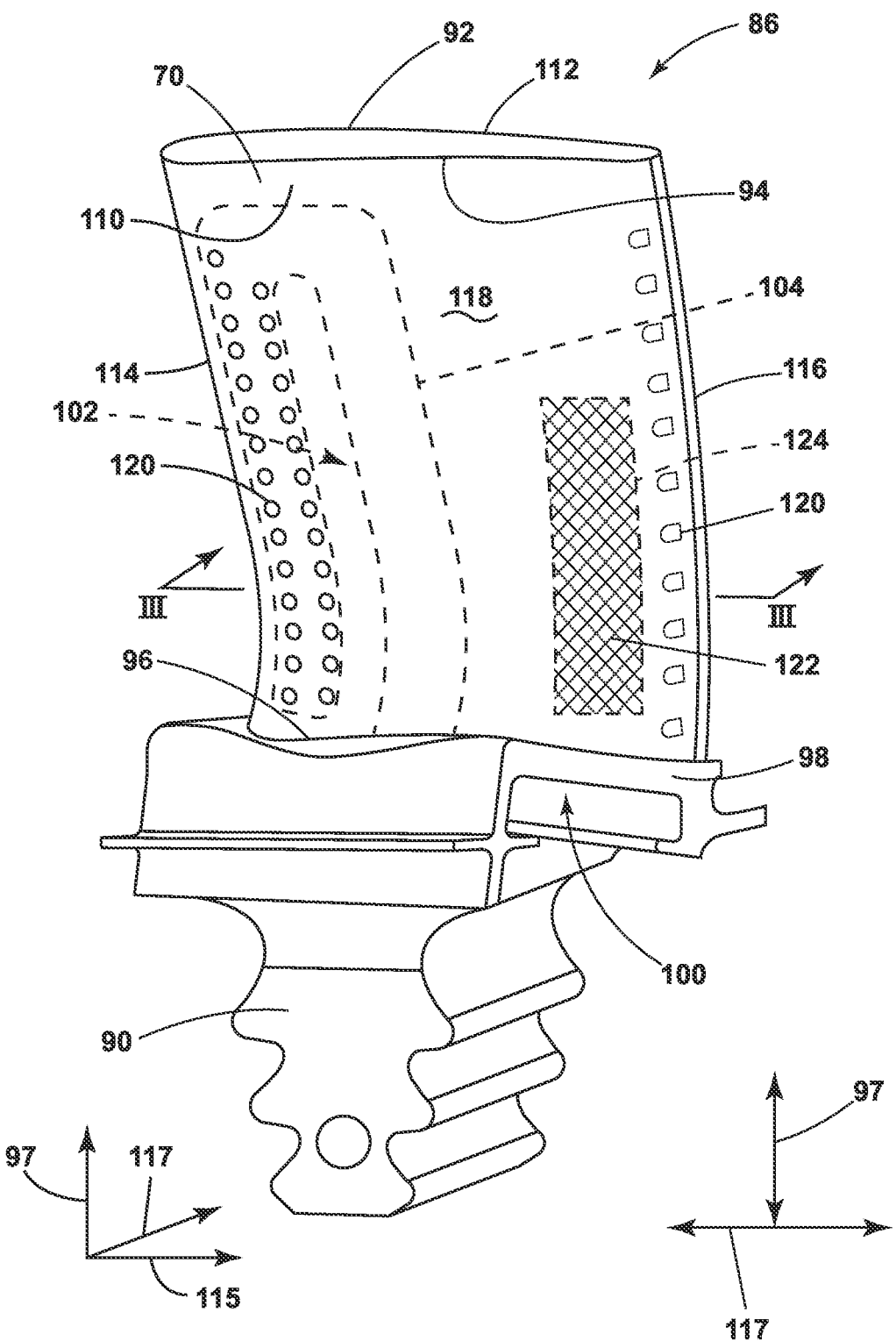
FIG. 2 is a perspective view of a turbine blade for the turbine engine from FIG. 1 including a structural segment illustrated in a cut-away portion of the drawing.

FIG. 2 is a perspective view of an engine component in the form of a turbine blade assembly 86 with a turbine blade 70 of the engine 10 from FIG. 1. Alternatively, the engine component can be a vane, a strut, a service tube, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction 97. The airfoil 92 mounts to the dovetail 90 on a platform 98 at the root 96. When multiple airfoils are circumferentially arranged in side-by-side relationship, the platform 98 helps to radially contain the turbine engine mainstream air flow and forms the radially inner wall of an annulus through which the air flows. The dovetail 90 can be configured to mount to the turbine rotor disk 71 on the engine 10. The dovetail 90 further includes at least one inlet passage 100 extending through the dovetail 90 to provide internal fluid communication with the airfoil 92.

The airfoil 92 includes a concave-shaped pressure side 110 and a convex-shaped suction side 112 which are joined together to define an airfoil cross-sectional shape of the airfoil 92 extending between a leading edge 114 and a trailing edge 116 to define a chord-wise direction 115. An outer periphery of the airfoil 92 is bound by an outer wall 118, which also defines the pressure and suction sides 110, 112. An interior 102 of the airfoil 92 can include at least one cooling supply conduit 104, illustrated in dashed line. The cooling supply conduit 104 can be fluidly coupled with the inlet passage 100. At least one cooling hole 120 can be located along any portion of the outer wall 118 including along the leading edge 114 and trailing edge 116 as illustrated. A lateral direction 117 perpendicular to both the span-wise direction 97 and the chord-wise direction 115 extends generally into the page.

The at least one cooling hole 120 can pass through a substrate, which by way of illustration is outer wall 118. It should be understood, however, that the substrate can be any wall within the engine 10 including but not limited to interior walls, a tip wall, or a combustion liner wall. A structural segment 122 can be disposed within a wall gap 124 formed interiorly of the outer wall 118.

Materials used to form the substrate and the structural segment can include, but are not limited to, steel, refractory metals such as titanium, or superalloys based on nickel, cobalt, or iron, and ceramic matrix composites. The substrate and structural segment can be formed by a variety of methods, including additive manufacturing, casting, electroforming, or direct metal laser melting, in non-limiting examples. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

Figure 3:
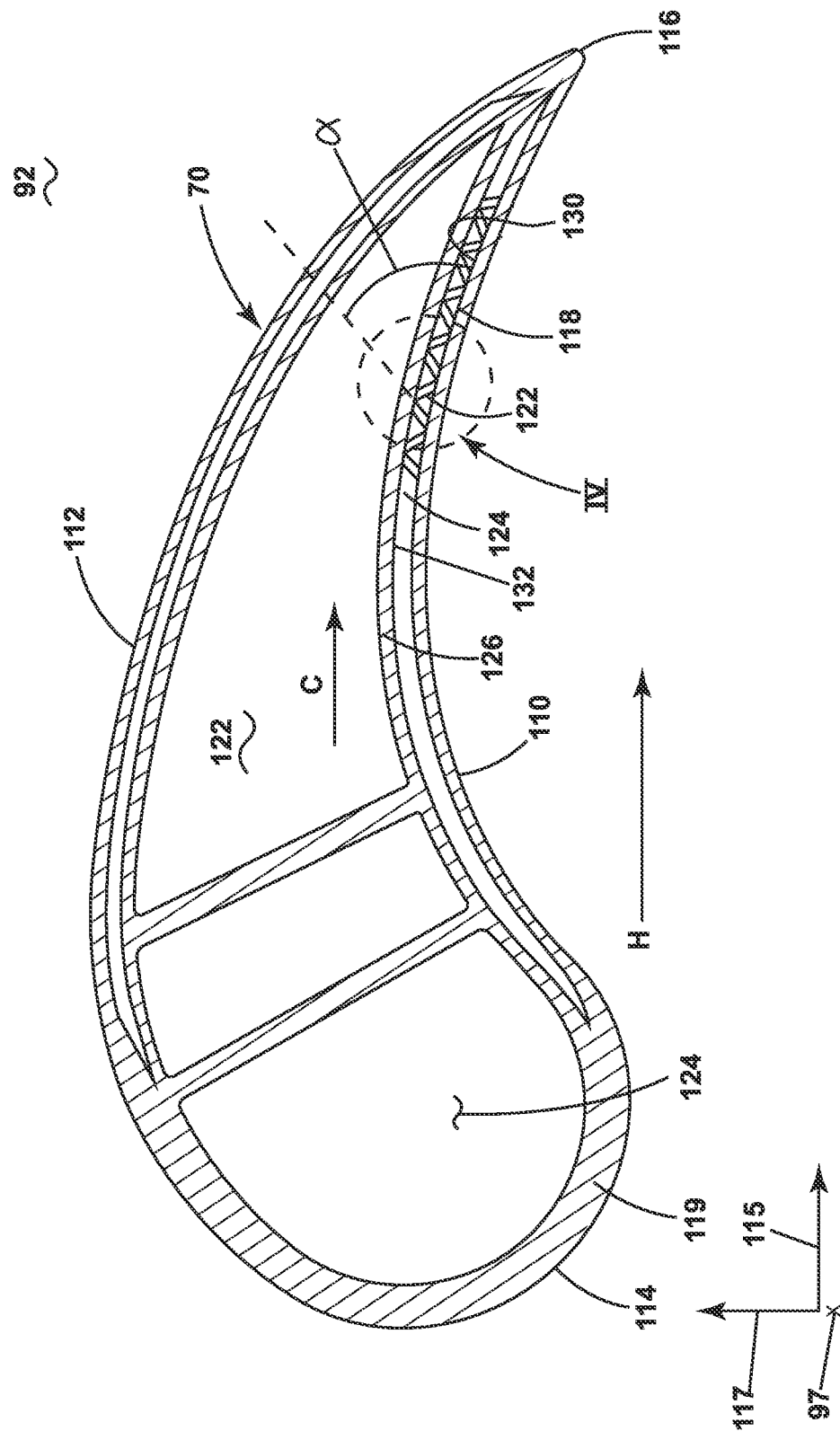
FIG. 3 is a cross-section of the turbine blade from FIG. 2 illustrating a wall gap in which the structural segment is located.

FIG. 3 is a cross-section taken along line of FIG. 2 more clearly illustrating the wall gap 124. The turbine blade 70 can further include an inner wall 126 located within the interior and spaced from the outer wall 118 to define the wall gap 124. It is contemplated that the inner wall 126 and the outer wall 118 can contact or abut one another to form a solid wall portion 119, as illustrated proximate the leading edge 114. Additionally, or alternatively, the inner wall 126 and outer wall 118 can be spaced apart such that the wall gap 124 is maintained around the entire airfoil 92. The structural segment 122 includes a plurality of structural elements 128 extending between the outer wall 118 and the inner wall 126 and oriented at a structural element angle (a), an acute angle with respect to either an interior surface 130 of the outer wall 118 or an interior surface 132 of the inner wall 126. While illustrated in a pin form, the plurality of structural elements 128 can take on any form or shape to form the structural segment 122, by way of non-limiting example a truss or web system within the wall gap 124. The structural elements 128 as described herein can be fins, pins, protuberances, turbulators, or any other form or shape suitable. It should be understood that the inner wall 126 faces a cooling flow C while the outer wall 118 faces a hot gas flow H.

Figure 4:
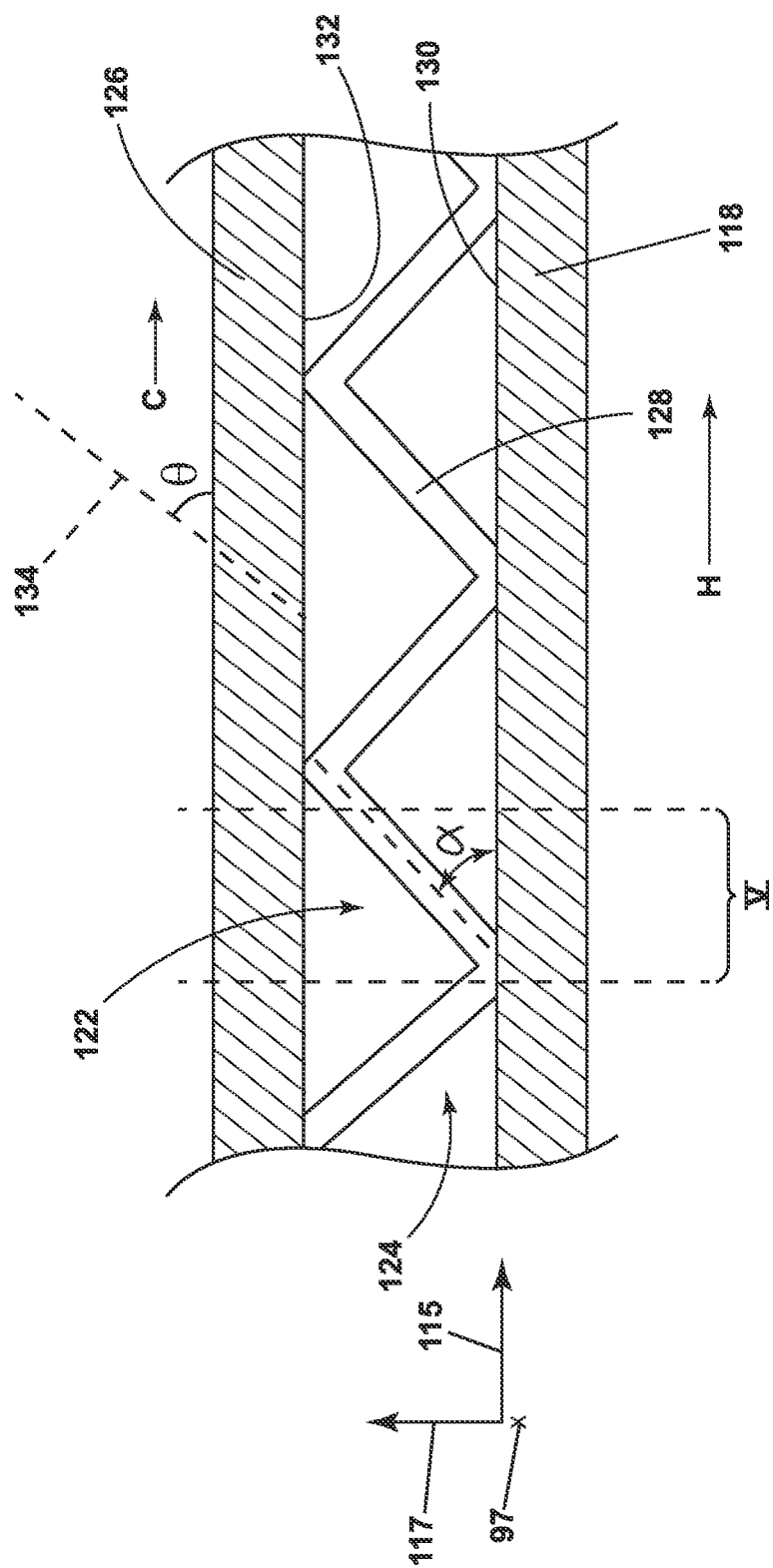
FIG. 4 is an enlarged view of the structural segment from FIG. 3.

FIG. 4 is an enlarged schematic view of a portion of the structural segment 122. The structural segment 122 is more clearly shown with the structural elements 128 extending between the outer and inner walls 118, 126. The structural element angle (α) is defined as an acute angle between the interior surface 130 and a centerline, illustrated in dashed line, of the structural element 128. The structural element angle (α) is measured between the structural element 128 and the interior surface 130 of the outer wall 118.

Figure 5:
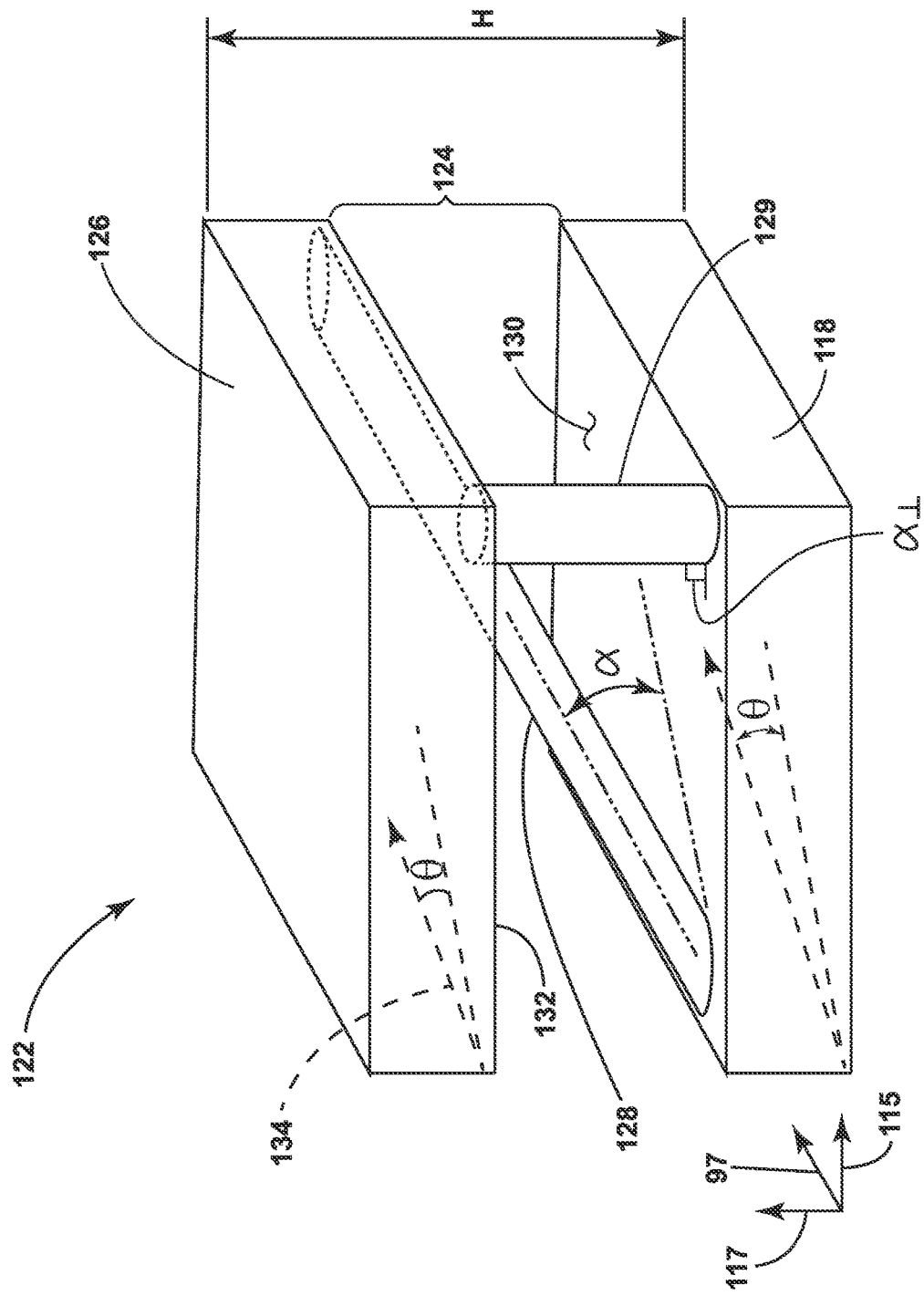
FIG. 5 is a perspective view of a portion of the structural segment from FIG. 4.

The outer and inner walls 118, 126 are made of the same material and therefore a crystallographic orientation 134 for the outer and inner walls 118, 126 are the same. The crystallographic orientation 134 reflects the stress/strain properties of the material that forms the outer and inner walls 118, 126. The degree of uniformity vs random distribution of the crystallographic orientation 134 is dependent on the percentage of crystals having a preferred orientation, represented at least in part by a grain angle (θ). The structural element angle (α) is generally assumed to not be equal to the grain angle (θ). An important aspect of the disclosure herein involves assessing the difference between a structural element angle (α) and a grain angle (θ) or considering the location of one angle relative to another by way of non-limiting example, iterating until an ideal or optimal difference between the angles is found Turning to FIG. 5, a schematic perspective view of an enlarged portion of the structural segment 122 is illustrated in 3D to more clearly show the crystallographic orientation 134 represented by the grain angle (θ), and the structural element angle (α) as an acute angle measured between the structural element 128 and the interior surface 130 of the outer wall 118. These angles are measured with respect to respective surfaces, as illustrated in FIG. 5. The orientation and placement of the structural element 128 influences the stiffness of the structural segment 122. By way of non-limiting example, a second structural element 129 is illustrated as extending perpendicularly between the inner wall 118 and the outer wall 126. As the structural element angle (α) approaches 90° as is illustrated by the angle (α⊥) for the second structural element 129, it should be understood that the structural segment 122 as a whole becomes stiffer in the lateral direction 117.

Figure 6A:
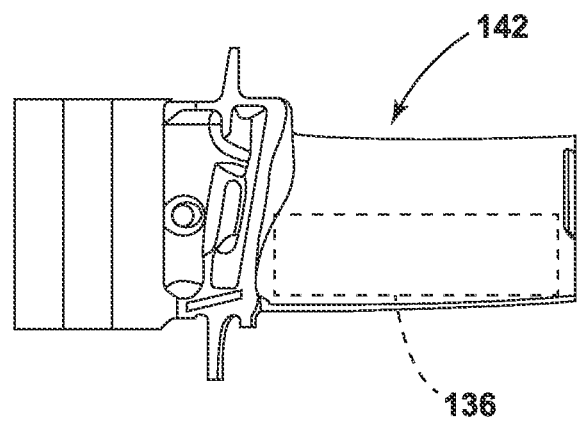
FIG. 6A is a schematic for a baseline blade, a turbine blade without the structural segment.

A baseline blade 142, by way of non-limiting example the turbine blade 70, is schematically illustrated in FIG. 6A. The baseline blade 142 is an engine component with known characteristics—thermal, aerodynamic, internal fluid flow and structural dynamics. At least a portion 136 of the baseline blade 142 can be represented in a computer model. It should be understood that while only part of the baseline blade 142 is represented in the portion 136, the portion 136 can be the entire baseline blade 142.

Figure 6B:
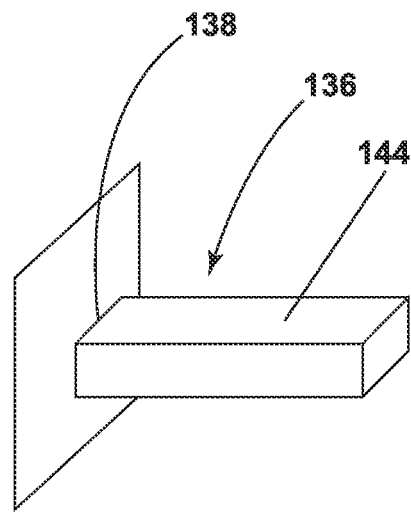
FIG. 6B is a schematic for a baseline panel portion, a model of at least a portion of the baseline blade from FIG. 6A.

Turning to FIG. 6B, the portion 136 can be modeled as a cantilevered beam and referenced herein as a baseline panel portion 144. The baseline panel portion 144 is a mathematical model (e.g., a finite element model) of the portion 136, which can represent an entirety of the baseline blade 142, and is constructed to model the same structural dynamic response characteristics as the baseline blade 142.

Figure 6C:
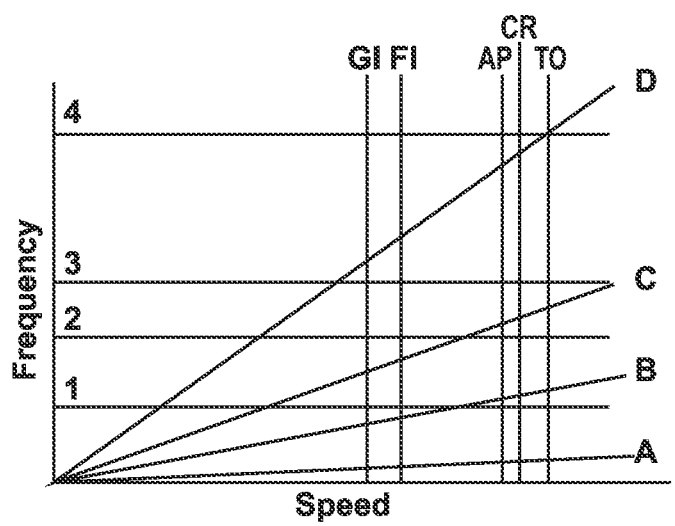
FIG. 6C is a corresponding Campbell diagram for the baseline blade with the baseline panel portion.

Turning to FIG. 6C, a Campbell diagram for the baseline panel portion 144 is illustrated having the same frequency response characteristics as baseline blade 142. The method includes determining a baseline set of frequencies, or modal frequencies (f=1, 2, 3, 4, etc.) for the baseline blade 142. The modal frequencies identified in FIG. 6C (f=1, 2, 3, 4, etc.) are represented by the y-axis. The engine 10 operates at various speeds, ground idle (GI), flight idle (FI), approach (AP), cruise (CR), and take off (TO), represented by the x-axis. The diagonal lines each represent various stages A, B, C, D within the engine that can produce a wake affecting a response of the baseline blade 142, expressed in terms of the participating mode shapes and respective modal frequencies. It is preferred that the three lines do not intersect at any single point as illustrated as this can produce unwanted amplification of the vibration.

Figure 7A:
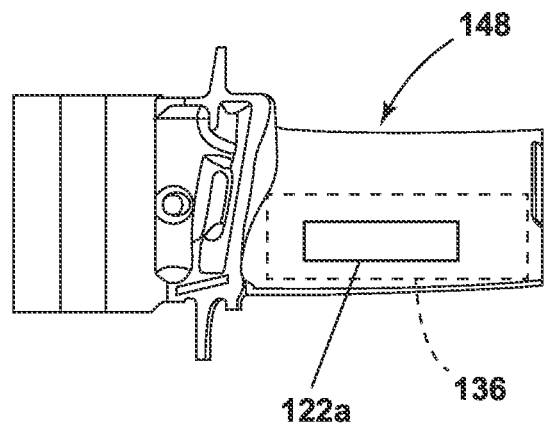
FIG. 7A is a schematic for a modified blade, a turbine blade with a modified structural segment.

FIG. 7A schematically illustrates a modified blade 148, modified to include a modified structural segment 122a. The modified blade 148 represents the modified baseline blade, if it were manufactured and subjected to physical testing.

Figure 7B:
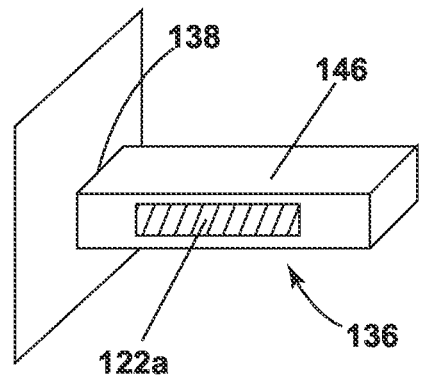
FIG. 7B is a schematic for a modified panel portion, a model of at least a portion of the modified blade from FIG. 7A.

FIG. 7B is a schematic representation of the portion 136 from the modified blade 148 in the form of a modified panel portion 146 with the modified structural segment 122a. Rather than performing physical testing on the modified blade 148, the method includes modeling the modified panel portion 146 with the modified structural segment 122a formed as described herein. During simulated operation, the modified panel portion 146 vibrates with a fixed end 138. The modified structural segment 122a schematically represents the modifications made to the baseline panel portion 144 to form the modified panel portion 146 to affect in a positive manner thermal, fluid flow or aerodynamic requirements for the turbine blade 70. It should be understood that these modifications are made to the model, not the physical blade.

The modified structural segment 122a is included in the modified panel portion 146 as a means for evaluating the effect that adding the modified structural segment 122a would produce on modal properties of the modified blade 148, including its vibratory response to external forces and related properties of importance to the design objective(s) including, but not limited to, cooling, fatigue resistance, and/or a weight decrease.

Figure 7C:
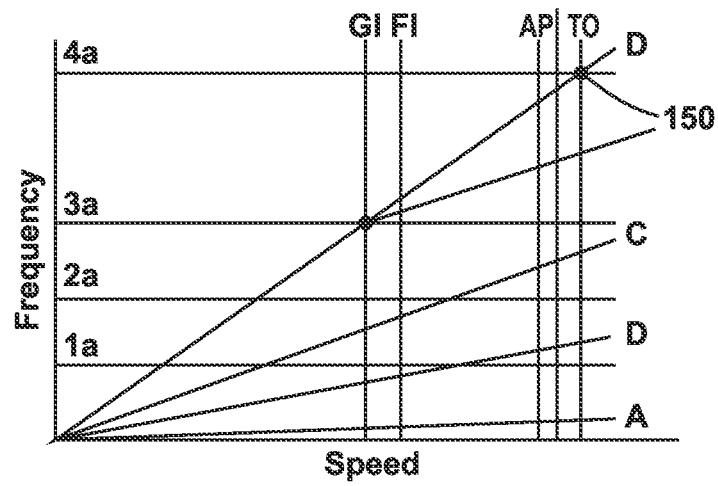
FIG. 7C is a corresponding Campbell diagram for the modified blade with the modified panel portion.

A corresponding Campbell diagram for the modified panel portion 146 is illustrated in FIG. 7C. The method includes determining a modified set of modal frequencies (f=1a, 2a, 3a, 4a, etc.) associated with the modified panel portion 146 for the modified blade 148 during a simulated operation. Replacing the baseline panel portion 144 with the modified panel portion 146, including the modified structural segment 122a, can shift the baseline set of modal frequencies (f=1, 2, 3, 4, etc.) to the modified set of modal frequencies (f=1a, 2a, 3a, 4a, etc.). The method can include comparing the modified set of modal frequencies (f=1a, 2a, 3a, 4a, etc.) to the baseline set of modal frequencies (f=1, 2, 3, 4, etc.) to determine if the modified set of modal frequencies (f=1a, 2a, 3a, 4a, etc.) will cause a resonance condition in the modified blade 148 if it were used in the engine. As is illustrated, this shift can cause the three lines, frequency, speed, and engine stage, to intersect at a single point, see points 150. In one possible scenario, the third test resonance frequency 3a, the ground idle speed (GI), and the engine stage (D) all intersect, meaning that while idling on the ground the modified blade 148 could become amplified in its vibrations.

Figure 8A:
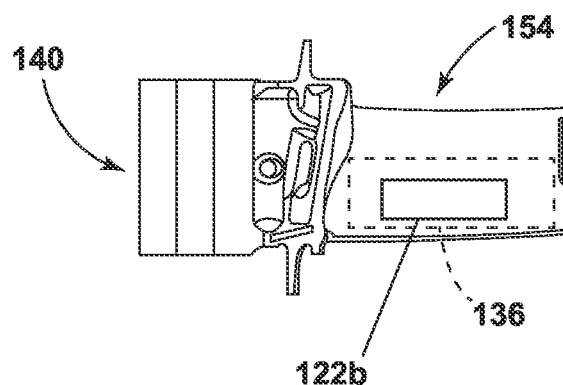
FIG. 8A is a schematic for a turbine blade representing a tuned blade with a tuned structural segment.

FIG. 8A schematically illustrates a tuned blade 154 modified to include a tuned structural segment 122b provided in the portion 136 as previously illustrated. In an event where the modified set of modal frequencies causes a resonance condition, an additional iteration of the modeling can occur. The tuned blade 154 can be modeled to behave as the blade 70 would during normal operation of the turbine engine 10.

Figure 8B:
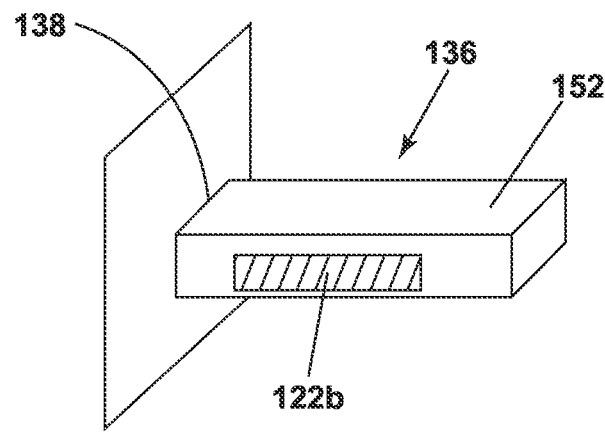
FIG. 8B is a schematic for a tuned panel portion, a model of at least a portion of the tuned blade from FIG. 8A.
Figure 8C:
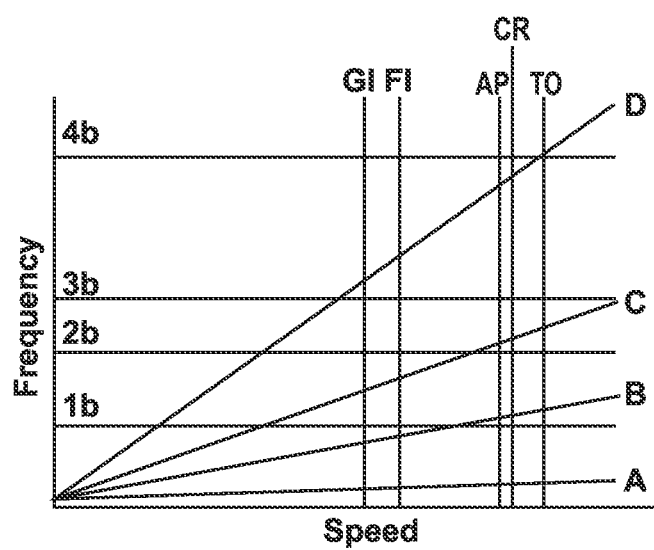
FIG. 8C is a corresponding Campbell diagram for the tuned blade with the tuned panel portion.

FIG. 8B is a schematic of the portion 136 from the tuned blade 154 in the form of a tuned panel portion 152 with the tuned structural segment 122b. Again, rather than performing physical testing on the tuned blade 154, the method includes modeling the tuned panel portion 152 with the tuned structural segment 122b formed as described herein.

A corresponding Campbell diagram for the tuned panel portion 152 is illustrated in FIG. 8B. The tuned panel portion 152 corresponds with the tuned set of modal frequencies (f=1b, 2b, 3b, 4b, etc.), represented in a set of frequencies that avoid an overlapping situation where all three curves intersect, such as previously described at points 150 in FIG. 7C.

In order to mitigate the vibratory response to engine conditions, while incorporating desired thermal, fluid flow or aerodynamic changes to the turbine blade 70 (in one example), the method includes comparing the modified set of modal frequencies (f=1a, 2a, 3a, 4a, etc.) to the baseline set of modal frequencies (f=1, 2, 3, 4, etc.). The tuned structural segment 122b can be developed by adjusting one or more structural or performance attributes. By way of non-limiting example, these structural or performance attributes can be adjusted in the wall gap 124 and can include the structural element angle ($\alpha$) and a volume fraction (vF). The volume fraction (vF) is a numerical value associated with the amount of space the structural elements 128 occupy in the wall gap 124. A solid wall gap, or essentially no wall gap, would have a volume fraction equal to one ($v_F$=1). As one or more of these variables are modified, the modified set of modal frequencies (f=1a, 2a, 3a, 4a, etc.) associated with the modified panel portion 146 change to form a tuned set of modal frequencies (f=1b, 2b, 3b, 4b, etc.) different than the modified set of modal frequencies (f=1a, 2a, 3a, 4a, etc.). It is contemplated that the modified set of modal frequencies (f=1a, 2a, 3a, 4a, etc.) and the tuned set of modal frequencies (f=1b, 2b, 3b, 4b, etc.) are different from each other. In some exemplary scenarios, however, the modified set of modal frequencies (f=1a, 2a, 3a, 4a, etc.) and the tuned set of modal frequencies (f=1b, 2b, 3b, 4b, etc.) can be similar, or even the same, in which case the modified structural segment 122a and the tuned structural segment 122b can be taken as the same.

Once adjusted, a test blade 140, by way of non-limiting example, the test blade 154 illustrated in FIG. 8A, is formed with a physical structural segment 122 to match the tuned structural segment 122b. It should be understood that the test blade 140 can also be the modified blade 148, depending on which model avoids the overlapping situation illustrated by points 50 in FIG. 7C while retaining the desired thermal, airflow and aerodynamic properties from the modified blade. Physical testing can now be performed. The method described herein narrows the blade possibilities to a more limited class worth testing, providing substantial cost and time savings.

Figure 9:
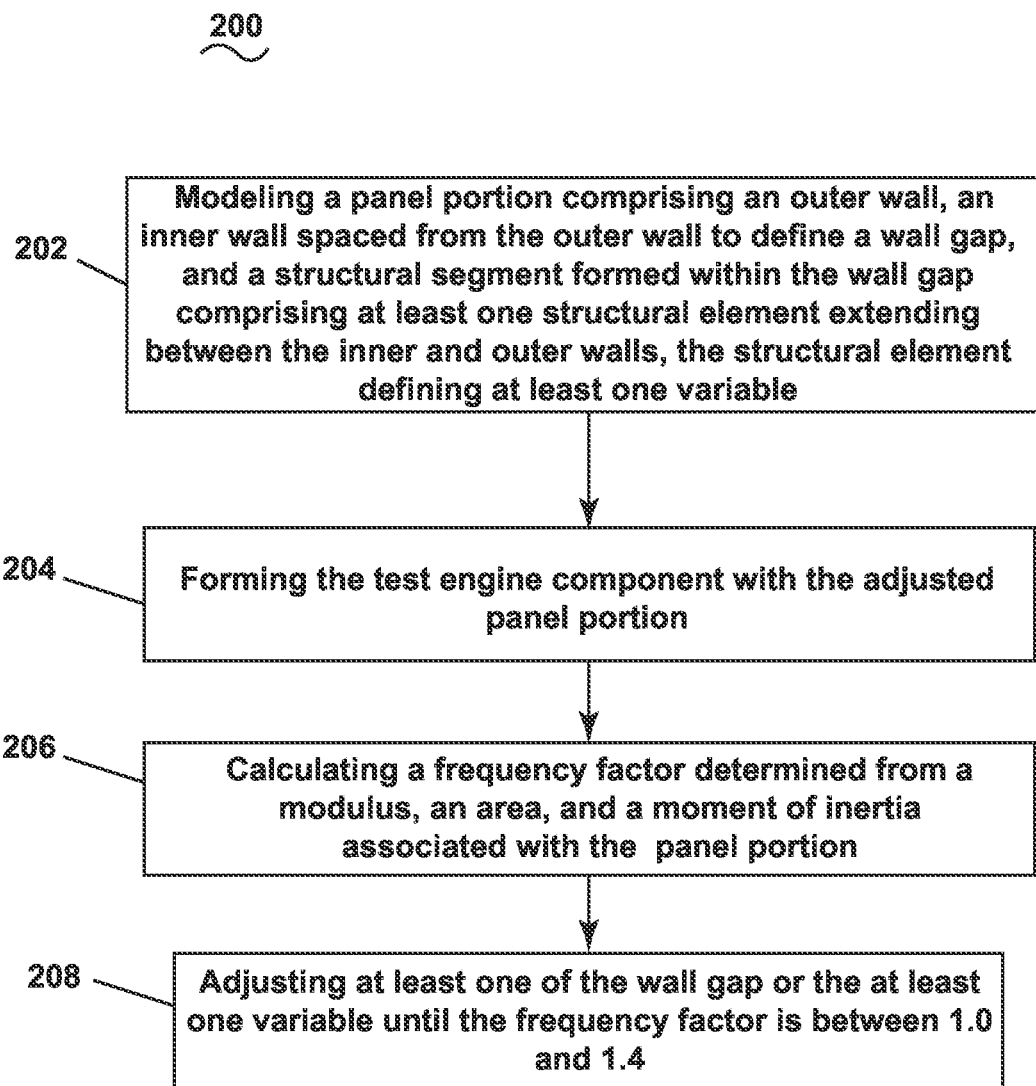
FIG. 9 is a flow chart for a method of forming a test blade for manufacturing the blade in FIG. 2.

FIG. 9 is a flow chart for another method 200 of forming a test engine component, by way of non-limiting example the test blade 140, for manufacturing the turbine blade 70 as described herein. The method 200 includes at 202 modeling a panel portion, by way of non-limiting example the modified panel portion 146 as described herein. The method 200 includes at 204 calculating a frequency factor (Ff) associated with the modified panel portion 146. A modal frequency (f) for a cantilever may be calculated as follows:

$$f = \frac{c^2}{L^2\sqrt{\rho}}\sqrt{E\frac{I}{A}}$$

Where the variables are a constant (c) associated with a modal frequency (1, 2, 3, etc.), (L) is length, (p) is mass density, (E) is elasticity modulus, and a cross-sectional moment of inertia (I) and area (A).

It is desirable to essentially have embodied in a structural segment, such as a turbine blade among the disclosed embodiments, an optimal combination of these values, which achieves the sought-after tuned properties for a given performance criteria (i.e., size, aero-dynamics, cooling, etc.). An optimal frequency response for the structural segment was chosen among candidate structural segments where the candidate structural segments were differentiated from each other by differences in calculated values for one or more of E, I, and A.

It was found, unexpectedly, that a parameter may be defined and used in such a manner to identify structural properties for achieving the stated objectives, as previously discussed, in an efficient and useful manner, such that a limited number of choices are found reflecting the acceptable trade-off between competing needs for the structural component, as will be appreciated when practiced in light of the description.

This parameter is called the frequency factor (Ff):

$$Ff = \sqrt{E'\frac{I'}{A'}}$$

The calculated modulus (E') is a ratio of an effective modulus ($E_{eff}$) associated with the modified panel portion 146 to a baseline modulus ($E_o$) associated with the baseline panel portion 144. For the anisotropic material, $E_o$ is taken as the effective or equivalent isotropic modulus. The calculated moment of inertia (I') is the ratio of an effective moment of inertia ($I_{eff}$) associated with the modified panel portion 146 to the moment of inertia ($I_o$) associated with the baseline panel portion 144. And the calculated area (A') is the ratio of an effective area ($A_{eff}$) with the modified panel portion 146 to the baseline area ($A_o$) associated with the baseline panel portion 144.

Referring again to FIG. 9, the method 200 can include determining each of the desired values (E', I', A') associated with the panel portion, by way of non-limiting example the modified panel portion 146. It should be understood that the effective variables ($E_{eff}$, $I_{eff}$, $A_{eff}$) can change depending on which panel portion, the modified panel portion 146 or the tuned panel portion 152 is being utilized to determine each variable.

$$E' = \frac{E_{eff}}{E_o} \quad I' = \frac{I_{eff}}{I_o} \quad A' = \frac{A_{eff}}{A_o}$$

Single crystal materials are anisotropic in nature, meaning they have varying properties that are dependent on the crystal orientation. When calculating the effective modulus ($E_{eff}$), see Equation (1) below, for a structure, the orientation of the grain and how the structure is defined relative to that orientation must be taken into consideration.

$$E_{eff} = [E_{min} + (E_{max} - E_{min})(\sin(|\alpha|) - \sin(|\theta|)](1 - v_F) + E_o v_F \quad \text{Eq.(1)}:$$

In order to calculate the effective modulus ($E_{eff}$), the modulus of the panels surrounding the structural segments ($E_o$), which is the same ($E_o$) that would be used for the baseline blade 142 needs to be calculated. Recall, as previously stated herein, the equations reflect the average or effective isotropic modulus equivalent for the anisotropic material. The minimum and maximum elastic modulus, ($E_{min}$) and ($E_{max}$), quantities of the single crystal material chosen, are dependent on the grain orientation, and represent a highest modulus direction and a lowest modulus direction, respectively, for the anisotropic material. The resulting equation is a composite of two parts: the elastic modulus of the "structural segments" and the elastic modulus of the panels to form an overall effective modulus, can then be derived. The effective modulus ($E_{eff}$) of the structural segments 122 described herein is influenced by the orientation of the pins, structural element angle ($\alpha$), with respect to the grain orientation, grain angle ($\theta$), the grain grain angle ($\theta$) itself, and the "amount" of pins with respect to the overall size of the structure, the volume fraction ($v_F$). The effective modulus ($E_{eff}$) of the panels is calculated by the modulus of the panels ($E_o$) and the "amount" of panel there is with respect to the size of the structure, also calculated utilizing volume fraction ($v_F$).

The calculated modulus (E') is therefore determined by a relationship based on the grain orientation reflected in the grain angle $\theta$ in comparison to the structural element orientation reflected in the structural element angle ($\alpha$) by considering the difference between the structural element angle ($\alpha$) and the grain angle ($\theta$). It is contemplated that the absolute value of the difference between the structural element angle ($\alpha$) and the grain angle ($\theta$) is between 45 and 90 degrees. It is further contemplated that the difference between the structural element angle ($\alpha$) and the grain angle ($\theta$) is between 10 and 90 degrees. Further, the relationship for determining the calculated modulus is based on a volume fraction ($v_F$) associated with the amount of structural elements 128 filling in the wall gap.

Changing anything associated with the structural elements 128 described herein will influence the volume fraction ($v_F$), which in turn will influence the calculated area (A') and the calculated moment of inertia (I'), making the overall quantity of the Frequency Factor (Ff) important in narrowing down feasible options for manufactured blades, or other engine components. In considering only the calculated modulus (E'), one ignores other factors associated with influencing the frequency of the modeled structure. Calculating the frequency factor (Ff) eliminates undesirable options for manufacturing blades by considering all factors.

Determining the calculated moment of inertia (I) and the calculated area (A) can be done utilizing solid 3D modeling software based on known variables. The known variables for the calculated area (A) can include the volume fraction ($v_F$) associated with the structural elements 128, where for the baseline panel portion 144 ($v_F$=1), a base dimension (b) associated with the panel portions 144, 146, 152 as discussed herein, and a height dimension (h) associated with the thickness of the walls 118, 126 and the wall gap 124 for each of the panel portions 144, 146, 152 discussed herein. The calculated moment of inertia (I) is determined at least in part by the base dimension (b) and the height dimension (h).

At 206 the method includes adjusting at least one of the wall gap 124 or at least one variable (wall gap 124, structural angle ($\theta$), or volume fraction ($v_F$)) until the frequency factor is between 1 and 1.4 to define an adjusted panel portion, by way of non-limiting example the tuned panel portion 152 as described herein. The frequency factor (Ff) is unique to each structural segment 122, and therefore any individual panel portion 144, 146, 152 as described herein. The frequency factor (Ff) associated with a solid blade panel, or the baseline panel portion 144 as described herein, would be equal to 1, effectively when (Ff=1) there is no wall gap 124. Introducing the wall gap 124 alone will increase the frequency factor to around 1.4, effectively when (Ff=1.4) there is a wall gap 124 but no structural elements 128. To increase the stiffness the structural elements 128 are added. In order to prevent the three lines in the Campbell diagram from intersecting, the structural element orientation, and more specifically the structural element angle $\alpha$ can be adjusted, or tuned, such that the tuned panel portion 152 with the tuned structural segment 122b has a frequency factor where 1.0<Ff<1.4, and more preferably 1.03<Ff<1.25.

At 208, a test engine component, by way of non-limiting example the test blade 140 as described herein, is formed with the adjusted panel portion, either the modified or the tuned panel portions 146, 152 as described herein.

It should be understood that an entirety of the turbine blade 70 as described herein can be treated as a single panel portion. Furthermore, it should be understood that the turbine blade 70 as described herein can be separated into multiple panel portions as described herein where a frequency factor (Ff) for each panel portion is determined in order to determine a total frequency factor (TFf) for the entire turbine blade 70. It is further contemplated that the total frequency factor (TFf) is also within the range where 1.0<TFf<1.4, and more preferably 1.03<TFf<1.25.

It should be further understood that the modified panel portion 146 and the tuned panel portion 152 can be one in the same, in a scenario, by way of non-limiting example, where the frequency factor (Ff) was between 1.0 and 1.4 and the lines on the Campbell diagram did not all intersect at any single point prior to the adjusting step.

Figure 10:
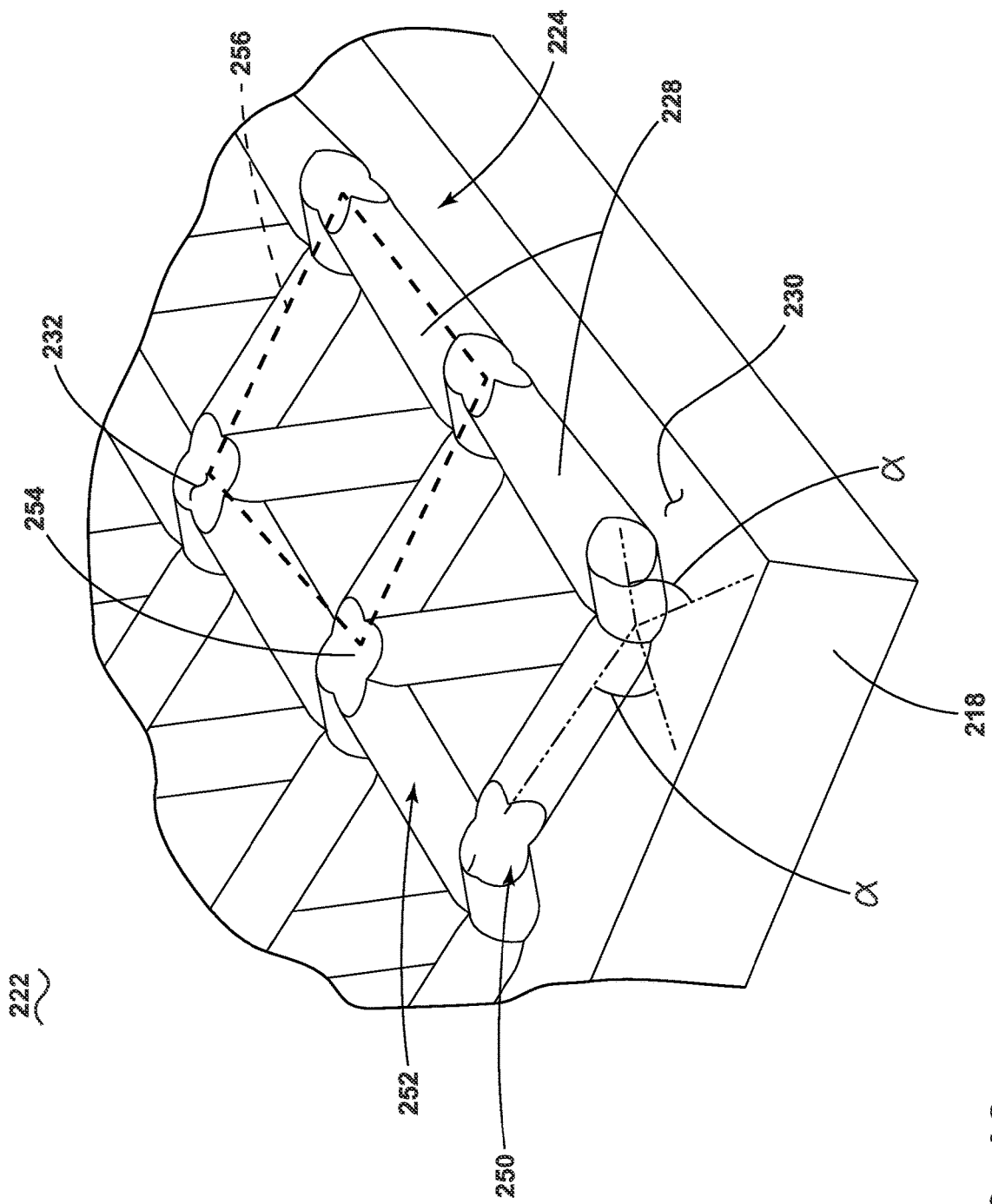
FIG. 10 is a perspective view of an exemplary structural segment according to an aspect of the disclosure herein.

Turning to FIG. 10 an exemplary structural segment 222 is illustrated. The structural segment 222 can include trusses 250 formed from four structural elements 228 located within a wall gap 224 formed between an inner wall (removed for clarity) and an outer wall 218. The four structural elements 228 form a pyramid shape 252 having an apex 254 and a base 256 such that the pyramid shape 252 alternates in orientation such that the apex 254 alternates between being formed at an interior surface 232 of the inner wall (removed for clarity) and an interior surface 230 of the outer wall 218. The base 256 includes four corners which are each an apex 254 for adjacent pyramid shapes 252. The structural segment 222 produces a frequency factor where 1.0<Ff<1.4 for a panel portion in which the structural segment 222 is formed. While illustrated as intersecting at the inner or outer wall 218, it should be understood that the structural elements 228 can intersect at any point in the wall gap 224 where the apex 254 is spaced from both the interior surface 230 of the outer wall 218 and the interior surface 232 of the inner wall. In other words, the structural elements can make an "X" shape. It should be understood that the exemplary structural segment 222 is for illustrative purposes and not meant to be limiting as the structural elements 228 can be oriented in any way producing a complex shape of multiple intersection points.

Figure 11:
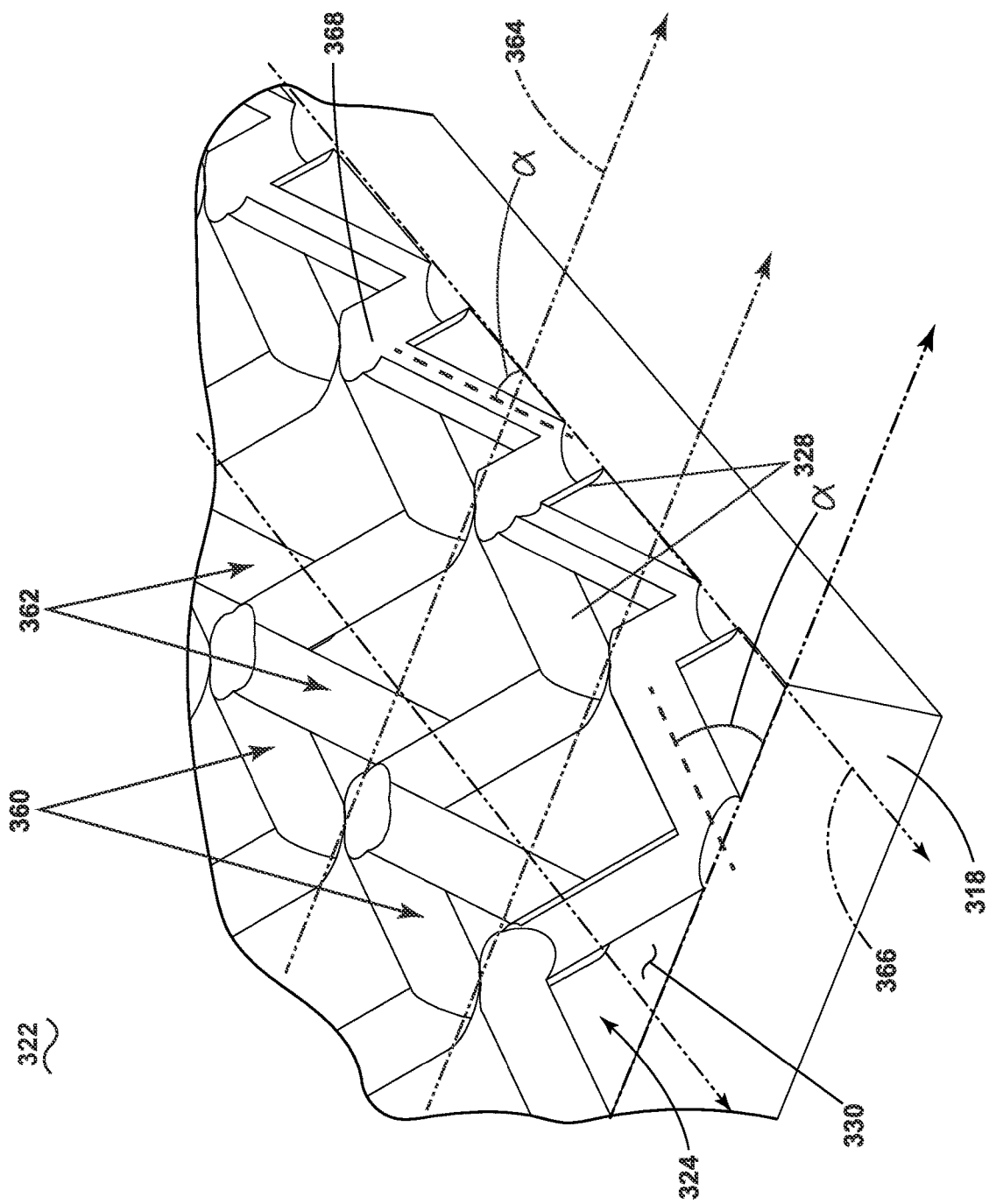
FIG. 11 is a perspective view of an exemplary structural segment according to another aspect of the disclosure herein.

Turning to FIG. 11 an exemplary structural segment 322 is illustrated. The structural segment 322 includes first and second sets of structural elements 360, 362 located within a wall gap 224 formed between an inner wall (removed for clarity) and an outer wall 318. The first set of structural elements 360 is formed in a zig zag shape where each structural element 328 extends from an interior surface 332 of the inner wall (removed for clarity) to an interior surface 330 of the outer wall 318 along at least one line extending in a first direction 364. The first set of structural elements 360 can be multiple sets of structural elements 360 spaced from each other along multiple lines extending in the first direction 364 as illustrated. The second set of structural elements 362 is formed in a zig zag shape where each structural element 328 extends from the interior surface 332 of the inner wall (removed for clarity) to the interior surface 330 of the outer wall 318 along at least one line extending in a second direction 366. The second set of structural elements 362 can be multiple sets of structural elements 362 spaced from each other along multiple lines extending in the second direction 366 as illustrated. The first and second set of structural elements 360, 362 intersect at an intersection point 368 along the interior surface 332 of the inner wall. It should be understood that multiple intersection points 368 are contemplated as illustrated. While illustrated as intersecting at the inner or outer wall 318, it should be understood that the structural elements 328 can intersect at any point in the wall gap 324 where the apex 354 is spaced from both the interior surface 330 of the outer wall 318 and the interior surface 332 of the inner wall. In other words, the structural elements can make an "X" shape.

As previously stated, the turbine blade 70 can be separated into multiple panel portions. It should be further understood that each panel portion can include structural elements oriented as the same structural element angle (α) or each structural element can be oriented at various structural element angles not equal to each other. Mathematical modeling, i.e. integrals of the panel portions as a whole, can account for varying values of the structural element angle (α) as described herein. In the same vein, it should be understood that with a change in material, the grain angle (θ) as described herein can also vary. Therefore, it should be understood that the exemplary structural segments 222, 322, while illustrated as having a single structural element angle (α), the values of this angle can vary or be the same.

Benefits associated with the apparatus and method described herein include providing a new tool for an engineer/designer. With the method described herein, an engineer can now use structural element angles with respect to grain orientation, or the grain angle (θ) as described herein, to impact the overall frequency of the structure.

Additional benefits associated with the structural segments as described herein include decreasing the weight of a blade while simultaneously maintaining the structural integrity and natural resonance of the blade as described herein. Tuning enables multiple dimensional changes in various portions of the blade. Benefits further include structural benefits, stiffness benefits, stiffness tuning. Stiffness tuning is especially important for turbine blades. High cycle fatigue and the monitoring thereof is critical. This drives the compromise necessary between adding more weight and moving structural elements along with other general items that make blade design less efficient overall. The structural segments as designed herein can also enable tailoring of the weight of a blade, improve structural integrity during manufacturing of a blade, and/or help manage thermal stresses during manufacturing of a blade Cooling benefits can also arise from the structural segments described herein including, but not limited to conduction benefits between the interior and exterior surface of the walls. In an event where cooling fluid is introduced, structural segments can enable heat transfer augmentation as well.

The structural segments as described herein can be manufactured utilizing additive manufacturing technologies or other advanced casting manufacturing technologies such as investment casting and 3-D printing and laser drilling and EDM drilling. The technologies available provide cost benefits along with the other benefits described. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turboprop engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects, and advantages of the present disclosure may also be embodied in the following technical solutions as defined by the clauses:

An engine component for a turbine engine, the engine component comprising: a wall comprising an inner wall and an outer wall spaced from the inner wall to define a wall gap and bounding an interior; a structural segment defining a portion of the wall, the structural segment comprising at least one structural element disposed between the inner wall and the outer wall at an orientation defined by a structural element angle; wherein a frequency factor determined from a modulus, an area, and a moment of inertia, each associated with the structural segment, is between 1 and 1.4.

The engine component of any preceding clause, wherein the inner wall and the outer wall are formed from a material having a crystallographic orientation defined at least in part by a grain angle, and the structural element angle and grain angle form a relationship that determines the modulus.

The engine component of any preceding clause, wherein the at least one structural element has a volume fraction determined by an amount of structural elements filling in a space in the wall gap and the volume fraction further factors into the relationship that determines the modulus.

The engine component of any preceding clause, wherein the panel portion defines a base and a height that form a relationship that determines the moment of inertia, and with the volume fraction, the base and the height form a relationship that determines the area.

The engine component of any preceding clause, wherein the structural segment comprises trusses formed from at least four structural elements to define a pyramid shape.

The engine component of claim 5, wherein the pyramid shape alternates in orientation within the wall gap.

The engine component of any preceding clause, wherein the structural segment comprises a first set of structural elements oriented in a first direction and a second set of structural elements oriented in a second direction different than the first direction.

The engine component of any preceding clause, wherein the first and second set of structural elements intersect at an intersection point along an interior surface of one of the inner wall or the outer wall.

A method of forming a test engine component for manufacturing an engine component, the method comprising modeling a panel portion comprising an outer wall, an inner wall spaced from the outer wall to define a wall gap, and a structural segment formed within the wall gap comprising at least one structural element extending between the inner wall and the outer wall, the structural element defining at least one variable; calculating a frequency factor determined from a modulus, an area, and a moment of inertia associated with the panel portion; and adjusting at least one of the wall gap or the at least one variable until the frequency factor is between 1.0 and 1.4 to define an adjusted panel portion; forming the test engine component with the adjusted panel portion.

The method of any preceding clause, wherein adjusting the at least one variable includes adjusting a structural element angle defining the orientation of the at least one structural element extending between the inner wall and the outer wall.

The method of any preceding clause, further comprising determining a grain angle defining at least a portion of a crystallographic orientation of a material forming the inner wall and the outer wall.

The method of any preceding clause, further comprising determining the modulus wherein the at least one structural element has a volume fraction defining a portion of space in the wall gap filled by the at least one structural element and the volume fraction, the structural element angle, and the grain angle form a relationship that determines the modulus.

The method of any preceding clause, further comprising determining the area wherein the at least one structural element has a volume fraction defining a portion of space in the wall gap filled by the at least one structural element, the panel portion defines a base and a height, and the volume fraction, the base, and the height form a relationship that determines the area.

The method of any preceding clause, further comprising determining the moment of inertia wherein the panel portion defines a base and a height and the base and the height form a relationship that determines the moment of inertia.

The method of any preceding clause, further comprising determining a modified set of resonant frequencies for the engine component with a modified panel portion during operation and determining a baseline set of resonant frequencies associated with the engine component free of the modified panel portion and comparing the modified set of resonant frequencies to the baseline set of resonant frequencies and adjusting at least one of the wall gap or at least one variable until the modified set of resonant frequencies is equal to the baseline set of resonant frequencies.

A method of forming a test blade for manufacturing a blade, the method comprising modeling a baseline blade to define a baseline panel portion; determining a baseline set of modal frequencies for the baseline panel portion during simulated operation; modeling a modified blade to define a modified panel portion with an outer wall, an inner wall spaced from the outer wall to define a wall gap, and a structural segment defining a portion of the wall at least one structural element disposed within the wall gap; determining a modified set of modal frequencies for the modified blade during simulated operation; comparing the modified set of modal frequencies to the baseline set of modal frequencies; adjusting the structural segment to define a tuned structural segment, in an event where the modified set of modal frequencies causes a resonance condition in the modified blade, and modeling a tuned blade to define a tuned panel portion with the tuned structural segment; and forming the test blade with a structural segment matching one of the modified panel portion or the tuned panel portion.

The method of any preceding clause, wherein adjusting the structural segment comprises adjusting at least one variable including a structural element angle defining the orientation of the at least one structural element within the wall gap.

The method of any preceding clause, wherein adjusting the at least one variable includes adjusting a volume fraction defining a portion of space in the wall gap filled by the at least one structural element.

The method of any preceding clause, further comprising calculating a frequency factor associated with the modified panel portion.

The method of any preceding clause, wherein adjusting the structural segment comprises adjusting at least one variable associated with the structural segment until the frequency factor is between 1.0 and 1.4.

What is claimed is:

1. An engine component for a turbine engine, the engine component comprising:
   a wall comprising an inner wall and an outer wall spaced from the inner wall to define a wall gap and bounding an interior;
   a structural segment defining a portion of the wall, the structural segment comprising at least one structural element disposed between the inner wall and the outer wall at an orientation defined by a structural element angle; and
   wherein a frequency factor, determined from a modulus, an area, and a moment of inertia, each associated with the structural segment, is between 1 and 1.4.

2. The engine component of claim 1, wherein the inner wall and the outer wall are formed from a material having a crystallographic orientation defined at least in part by a grain angle, and the structural element angle and the grain angle form a relationship that determines the modulus.

3. The engine component of claim 1, wherein the at least one structural element has a volume fraction determined by an amount of structural elements filling in a space in the wall gap and the volume fraction further factors into determining the modulus.

4. The engine component of claim 3, wherein the structural segment defines a base and a height that determines the moment of inertia, and with the volume fraction, the base and the height determines the area.

5. The engine component of claim 1, wherein the structural segment comprises trusses formed from at least four structural elements to define a pyramid shape.

6. The engine component of claim 5, wherein the pyramid shape alternates in orientation within the wall gap.

7. The engine component of claim 1, wherein the structural segment comprises a first set of structural elements oriented in a first direction and a second set of structural elements oriented in a second direction different than the first direction.

8. The engine component of claim 7, wherein the first set and the second set of structural elements intersect at an intersection point along an interior surface of one of the inner wall or the outer wall.

9. A blade for a turbine engine, the blade comprising:
   a wall having an inner wall and an outer wall spaced from the inner wall to define a wall gap and at least one structural element disposed between the inner wall and the outer wall at an orientation defined by a structural element angle; the wall having a modulus (E'), an area (A'), and a moment of inertia (I'); and
   wherein the blade has a frequency factor $$Ff = \sqrt{\frac{E'I'}{A'}}$$

determined from the modulus, the area, and the moment of inertia, and wherein the frequency factor is between 1 and 1.4.

10. The blade of claim 9, wherein the structural element angle is a factor in determining the modulus.

11. The blade of claim 10, further comprising a grain angle defining at least a portion of a crystallographic orientation of a material forming the inner wall and the outer wall.

12. The blade of claim 11, wherein the at least one structural element has a volume fraction defining a portion of space in the wall gap filled by the at least one structural element and the volume fraction, the structural element angle, and the grain angle form a relationship that determines the modulus.

13. The blade of claim 9, wherein the at least one structural element has a volume fraction defining a portion of space in the wall gap filled by the at least one structural element, the blade defines a base and a height, and the volume fraction, the base, and the height form a relationship that determines the area.

14. The blade of claim 9, wherein the blade defines a base and a height and the base and the height form a relationship that determines the moment of inertia.

15. The blade of claim 9, further comprising a modified panel portion having a modified set of resonant frequencies during simulated operation and a baseline panel portion having a baseline set of resonant frequencies associated with the blade free of the modified panel portion and wherein the blade comprises a set of resonant frequencies where the modified set of resonant frequencies is equal to the baseline set of resonant frequencies.

16. A test blade for a turbine engine, the test blade comprising:
   an outer wall, an inner wall spaced from the outer wall to define a wall gap, and a structural element disposed within the wall gap at an orientation defined by a structural element angle determining a frequency factor associated with the test blade; and
   wherein the test blade has a frequency factor of between 1 and 1.4 where a frequency factor equal to 1 is associated with a solid wall having no wall gap and a frequency factor equal to 1.4 is associated with a wall gap with no structural elements.

17. The test blade of claim 16, wherein only two of three lines representing a frequency, a speed, and an engine stage for the turbine engine intersect at any given point on a Campbell diagram associated with the test blade.

18. The test blade of claim 16, wherein a volume fraction defines a portion of space in the wall gap filled by a plurality of structural elements.

19. The test blade of claim 18, wherein the volume fraction and the structural element angle are determined from a computer-generated panel portion having a modulus (E'), an area (A'), and a moment of inertia (I').

20. The test blade of claim 19, wherein a frequency factor $$Ff = \sqrt{\frac{E'I'}{A'}}$$

for the computer-generated panel portion is equal to the frequency factor associated with the test blade.

* * * * *